Figure 1:
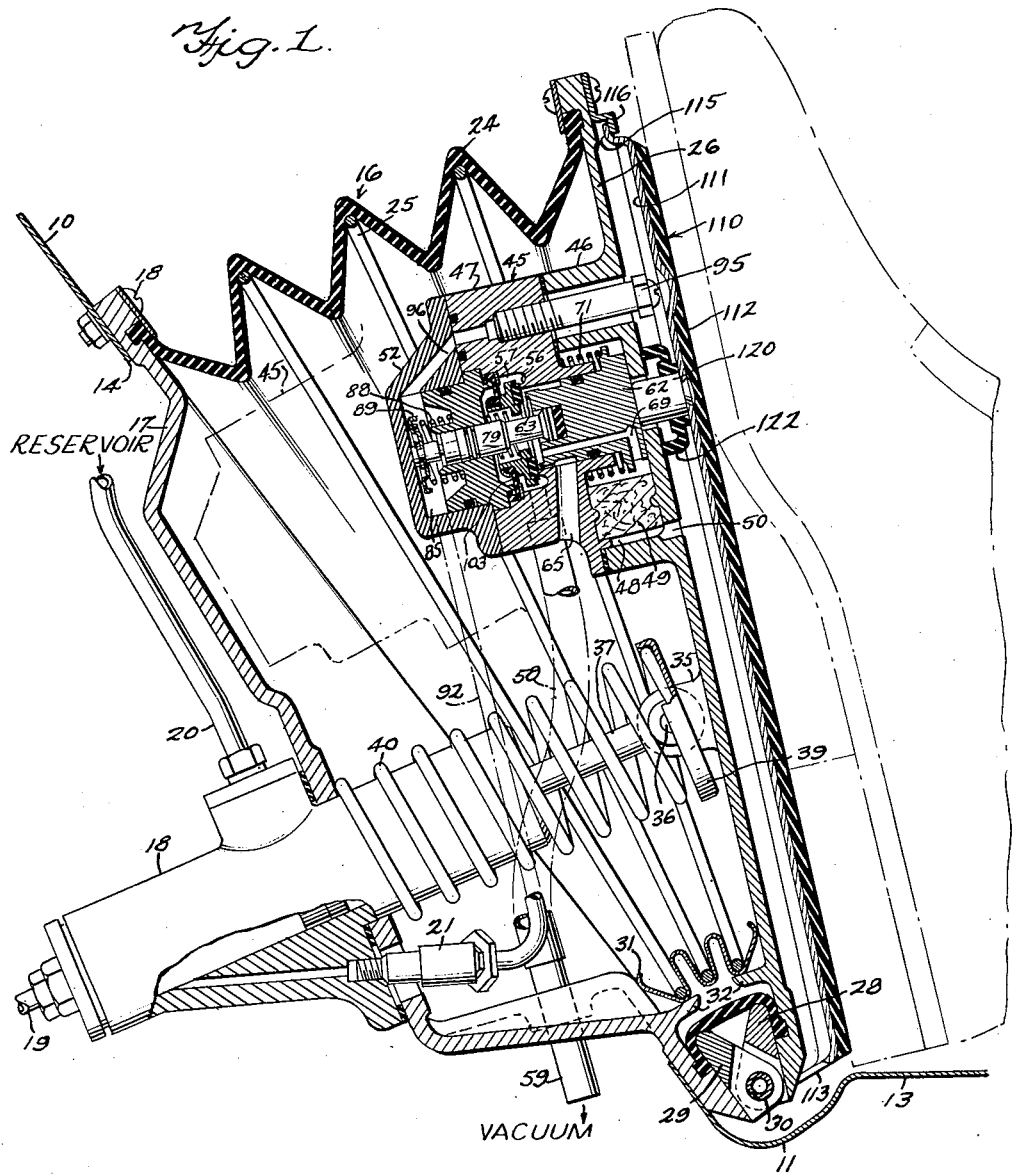

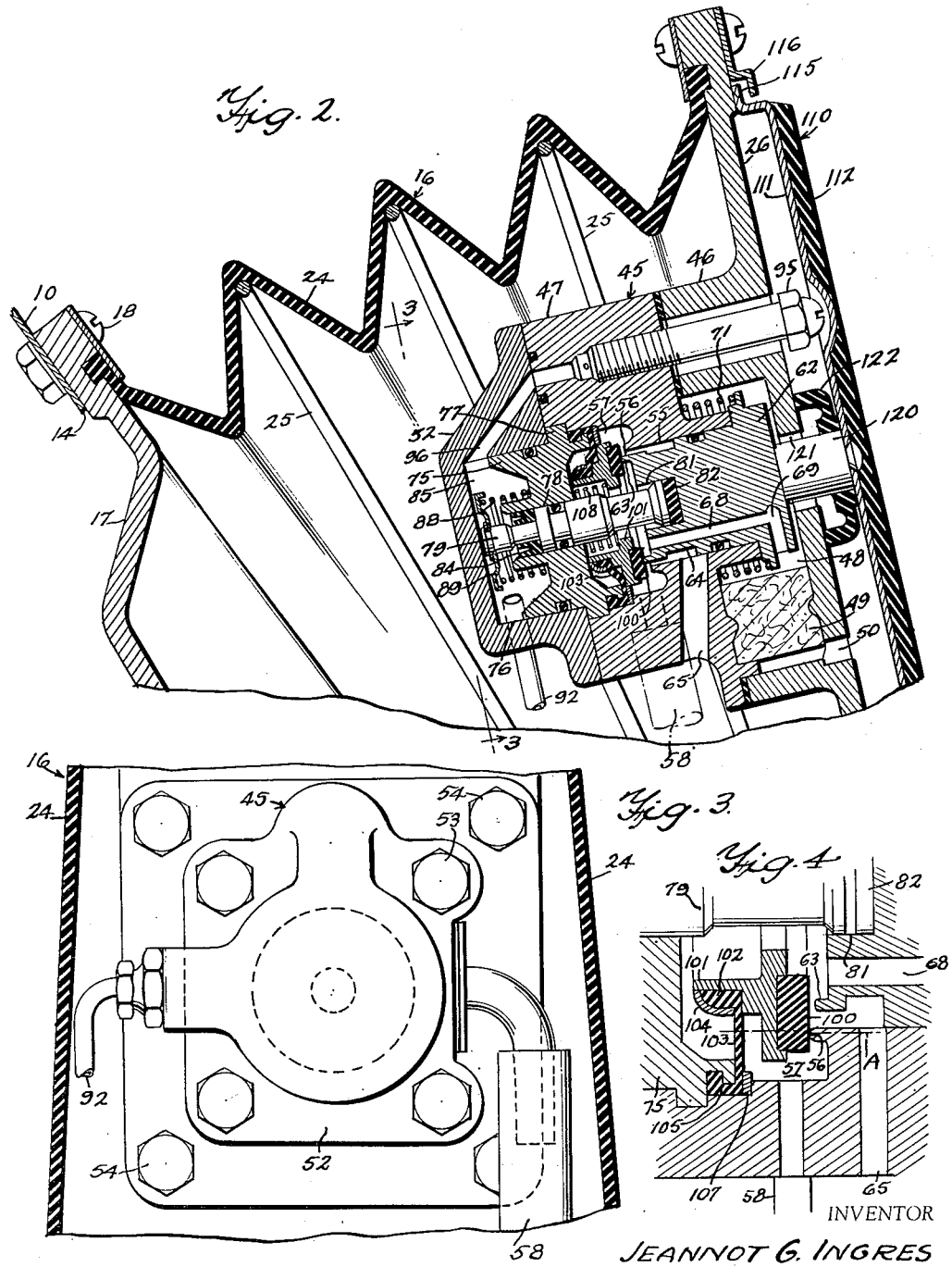

United States Patent Office 2,808,705
Patented Oct. 8, 1957

2,808,705

BOOSTER BRAKE MECHANISM

Jeannot G. Ingres, Dearborn, Mich., assignor to Kelsey-Hayes Company, a corporation of Delaware Application October 19, 1953, Serial No. 386,942

14 Claims. (Cl. 60—54.6)

This invention relates to a booster brake mechanism for motor vehicles.

In the co-pending application of Edward Govan Hill and David T. Ayers, Jr., Serial No. 347,700, filed April 9, 1953, there is disclosed a highly advantageous type of booster brake mechanism for motor vehicles, and particularly passenger vehicles. The construction shown in the co-pending application has a number of distinct advantages over prior constructions, particularly with respect to minimizing space required for its installation, and with respect to its adaptation to the vehicle in such a manner as to permit the use of a larger booster motor with higher power. These advantages are secured by providing a motor in the form of a bellows mounted directly on the toe board of the vehicle and extending rearwardly into the driver's compartment. The rear wall of the bellows forms one wall of the motor and has its outer face exposed to atmospheric pressure while valve mechanism is provided for exhausting air from the interior of the bellows to effect operation thereof to displace fluid from a master cylinder associated with the device. Operation of the valve mechanism is accomplished by a treadle arranged in close proximity to the rear wall of the motor and movable relative thereto to effect the valve operation.

It is highly desirable in a mechanism of this character to provide a fairly accurately balanced valve mechanism and to this end, the co-pending application shows several types of sleeve or spool valves which are readily movable from an off position without the usual disadvantage encountered in poppet valves which tend to remain on their seats due to fluid pressures affecting them. An important object of the present invention is to provide a booster brake mechanism, particularly of the bellows type referred to, having a novel type of poppet valve means for controlling the booster motor and which valve means is substantially pressure balanced to render it easily operable from its off position without any substantial tendency to stick in closed position.

A further object is to provide such a mechanism wherein the valve housing is carried by the rear or pressure wall of the bellows motor and supports a floating poppet valve device so constructed that pressures acting in opposite directions on the poppet valve are substantially balanced, thus rendering initial valve operation easily accomplished without any accompanying feeling of "lumpiness" in the operation of the treadle.

A further object is to provide such a device wherein air and vacuum valve seats of annular type are arranged adjacent and concentric to each other, one being carried by the valve body and the other by a movable spool connected to the treadle.

A further object is to provide a device of the character just referred to which lends itself particularly readily to the provisions of hydraulic reaction against the treadle, after actual brake operation has commenced, to provide the pedal with a highly desirable "feel."

A further object is to provide such a mechanism wherein the valve body is provided with a chamber remote from the treadle and having an end wall against which normally seats a reaction plunger having lost motion connection with the spool carrying the air valve, and to utilize pressures in such chamber for taking up the lost motion referred to whereby said plunger, subject to pressures in said chamber, coinciding with those in the master cylinder, will be moved by such pressures to react through the spool to the treadle to provide the latter with a direct hydraulic reaction "feel."

Other objects and advantages of the invention will become apparent during the course of the following description.

In the drawings I have shown one embodiment of the invention. In this showing:

Figure 1 is a central vertical sectional view through the booster motor structure, showing its arrangement relative to the toe and floor boards of the vehicle, the master cylinder being shown in elevation and the valve mechanism being shown in its normal off position, Figure 2 is a fragmentary sectional view of the upper part of the structure shown in Figure 1, with the valve mechanism illustrated in a motor energizing position, Figure 3 is a sectional view on line 3—3 of Figure 2, and Figure 4 is an enlarged fragmentary sectional view, generally diagrammatic in nature, showing the valve and associated elements in the off positions of the parts.

Referring to Figure 1, the numeral 10 designates the toe board of a vehicle at the lower end of which is arranged a depression 11, around which the toe board curves rearwardly and then upwardly to form a continuation of a conventional floor board 13. The toe board is provided with a relatively large opening 14 therethrough for a purpose which will become apparent.

The present invention comprises a motor indicated as a whole by the numeral 16. This motor comprises a preferably die cast body 17, shaped as shown in Figure 1, to accommodate the parts arranged forwardly thereof and to accommodate movement of other parts as will become apparent. The body 17 is fixed as at 18 to the toe board 10 and covers and projects through the opening 14.

The body 17 supports a generally conventional master cylinder 18 having an outlet 19 adapted for connection with the usual wheel cylinders. Replenishment of fluid in the master cylinder in the usual manner is accomplished through a pipe 20 connected to any suitable type of reservoir (not shown). Pressure generated in the master cylinder is communicated to the interior of the fitting 21 for a purpose to be described.

The motor 16 further comprises a collapsible bellows 24 having substantially rectangular subtending frames 25 to prevent the inward collapsing of the bellows under differential pressures. One edge of the bellows is connected to the body 17 and the other edge is connected to a pressure plate 26. This plate and the body 17 are provided with hinge elements 28 and 29. These elements are connected by a hinge pin 30. The lower extremity of the bellows 24 is not corrugated but bridges over the hinge elements 28 and 29. The top and both sides of the bellows are corrugated, but since the bellows per se forms no part of the present invention but is disclosed in the co-pending application referred to above, it is believed that no detailed illustration of the bellows is necessary. As disclosed in the co-pending application referred to, moreover, the bottoms of the subtending frames 25 are supported and fixed in position by a stamped corrugated retaining member 31, end portions of which seat on shoulders 32 carried respectively by the body 17 and plate 26.

The plate 26 carries a rearwardly extending boss 35 through which extends a hinge pin 36. This hinge pin pivotally connects to the boss 35 a plunger rod 37 extending into the master cylinder 18 and carrying the usual fluid displacing plunger (not shown). A spring seat 39, supported in any suitable manner with respect to the boss 35 or hinge pin 36, is engaged by one end to a return spring 40, the other end of which surrounds the adjacent end of the master cylinder and seats against the body 17.

The pressure movable plate 26 carries a valve body indicated as a whole by the numeral 45 and comprises a plurality of elements, one of which, 46, preferably is formed integral with the plate 26, and projects forwardly therefrom. A second valve body member 47 is fixed in any suitable manner with respect to the member 46, and these two valve body members cooperate to form a space 48 in which is arranged an air cleaner 49, further referred to below, and to which air is fed through one or more ports 50 formed in the plate 26.

The valve body 45 further comprises an inner end member 52 seating against the adjacent end of the member 47 as clearly shown in Figure 2. As previously stated, the member 47 is secured to the member 46 in any suitable manner and the end member 52 is suitably secured to the member 47. The securing means may be in the form of machine screws 53 (Figure 3) extending through the end member 52 and into member 47, and the latter member may be fixed to the member 46 by screws 54.

The valve body member 47 is provided with a cylinder 55, the inner extremity of which terminates in an annular vacuum valve seat 56. Beyond this seat, the member 47 is provided with an annular chamber 57 communicating with one end of a pipe 58 connected to a nipple 59 extending through the bottom of the member 17 for connection in any suitable manner with a source of partial vacuum, for example, the intake manifold of the motor vehicle engine. The pipe 58, of course, is flexible so as to permit movement of the valve body 45 about the axis of the pivot pin 30 during operation of the mechanism, as will become apparent.

Within the cylinder 55 is slidably arranged a spool 62, the inner end of which carries an annular valve seat 63 concentric with and spaced inwardly slightly from the vacuum valve 56, and the space between the valve seats affords communication between the chamber 57 and an annular groove 64 formed in the outer surface of the spool 62. This groove communicates at all times with the interior of the bellows 24 through a port 65.

The space within the air valve seat 63 communicates through a longitudinal passage 68 with a transverse port 69 open to the inner surface of the air cleaner 49. It will be apparent, therefore, that the space within the valve seat 63 is always in communication with the atmosphere. A spring 71 biases the spool 62 to the off position shown in Figure 1, with the right-hand end of the spool engaging against the plate 26.

A valve supporting body 75 is arranged in a cylindrical opening 76 formed in the end member 52 and is flanged as at 77 to be clamped between the members 47 and 52. The member 75 also is provided with an axial opening 78 in which is slidable a plunger 79 and this plunger extends into an axial recess 81 formed in the spool 62. The bottom of this recess is provided with a cushion member 82, and the adjacent end of the plunger 79 is spaced from the member 82 when the parts are in the off position shown in Figure 1, for a purpose to be described.

A leakproof fit is provided between the plunger 79 and cylindrical opening 78 by a double-lipped seal 84, it being necessary to prevent leakage of hydraulic fluid from the chamber 85 formed in the end member 52 rearwardly of the member 75, as will become apparent.

The member 75 is stationary relative to the valve body 45. A compression spring 88 engages at one end against the member 75 and at its opposite end against the spring seat 89 carried by the plunger 79. This spring therefore biases the left-hand end of the plunger into engagement with the adjacent end wall of the member 52 and maintains the lost motion between the cushion 82 and the adjacent end of the plunger 79 when the parts are in the off position.

The chamber 85 communicates through a flexible pipe 92 with the fitting 21, thus affording fixed communication between the master cylinder 18 and the chamber 85. In the operation of the mechanism, therefore, hydraulic pressures in the master cylinder will always be duplicated in the chamber 85. A conventional bleed valve 95 is connected to a passage 96 leading to the chamber 85 to bleed air from this chamber when the apparatus is to be placed in operation. The bleed valve forms no part per se of the present invention.

Referring to Figure 4, the numeral 100 designates an annular resilient valve selectively engageable with the seats 56 and 63. The valve element 100 is carried by an annular valve body 101 connected to an inner annular bead 102 of an annular diaphragm 103, the bead 102 being fixed in position by a clamping ring 104. The periphery of the diaphragm 103 is provided with a bead 105 maintained in position by the proper cooperative shapes of the adjacent portions of the body 47 and member 75 and the peripheral portion of the diaphragm is assisted in being maintained in position by a ring or washer 107. A light biasing spring 108 urges the valve body 101 and valve element 100 toward the valve seats 56 and 63.

Various pressures affect various surfaces of the valve 100, valve body 101 and diaphragm 103, and these pressures will be referred to below in connection with the operation of the apparatus.

Operation of the valve mechanism is accomplished by means of a treadle indicated as a whole by the numeral 110 and comprising a stamped metal plate 111, preferably having a rubber or other resilient facing member 112 bonded thereto. The lower end of the treadle is provided with an inwardly extending portion 113 pivotally connected to the pivot pin 30, and accordingly the plate 26 and treadle 110 both turn about the axis of the pin 30. The upper end of the treadle plate 111 is provided with an inwardly off-set lip 115 engaging the lip 116 carried by the plate 26 when the parts are in off positions shown in Figure 1. Under such conditions, the lip 115 is spaced from the plate 26 and accordingly the treadle 110 is adapted to partake of limited pivoting movement relative to the plate 26.

Movement is transmitted from the treadle to the spool 62 by means of a button 120 riveted to the treadle plate 111 and extending freely through an opening 121 in the plate 26 to engage the adjacent end of the spool 62. An annular boot 122 surrounds the button 120 to seal the opening 121 against the entrance of dust and other foreign material into the space 48.

*Operation*

The parts normally occupy the positions shown in Figure 1, the valve 100 engaging the valve seat 56 and the valve seat 63 being spaced from the valve 100 due to the biasing of the spool 62 to its limit of movement toward the right as viewed in Figure 1. Under such conditions, the interior of the motor will be in communication with the atmosphere through passage 65, around valve seat 63, passage 68, port 69 and thence through the air cleaner 49. Thus both sides of the pressure plate 26 will be subject to atmospheric pressure. The biasing spring 71 under such conditions will hold the treadle 110 spaced from the pressure plate 26 with the lip 115 engaging the lip 116.

When the brake is to be operated, the treadle 110 will be depressed by the operator's foot to effect movement of the spool 62 toward the left in Figure 1. Initial movement of the spool 62 brings the valve seat 63 into engagement with the valve 100, at which point the valve parts will reach lap position.

In the next increment of movement of the spool 62, the valve seat 63, engaging the valve 100, will move the valve 100 out of engagement with the seat 56. Under such conditions, the air passage 68 will be cut off from communication with the motor, and the chamber 57, being in fixed communication with the source of vacuum through pipe 58, will connect such source with the interior of the motor through passage 65. Thus the pressure plate 26 will be subjected to differential pressures and will start to swing counterclockwise about the pivot pin 30 (Figure 1), and movement will be transmitted from the pressure plate 26 through rod 37 to the master cylinder piston to displace fluid into the pipe lines 19 to apply the brakes. So long as movement is imparted to the treadle 110 in the manner described, the valve parts will remain in motor energizing positions to continue energization of the motor. If movement of the treadle 110 is arrested, slight additional movement of the pressure plate 26 will move the valve seat 56 into engagement with the valve 100 to restore the lap positions of the valve parts. If the operator releases pressure on the treadle 110, the biasing spring 71 will crack the valve 100 relative to the valve seat 63, thus admitting air into the interior of the motor. Thus, braking pressures may be reduced and, if the treadle 110 is completely released, the air valve seat 63 will remain out of engagement with the valve 100 and the parts will return to the fully off positions.

As previously stated, there is lost motion between the stem 79 and pad 82 in the off positions of the parts as shown in Figure 1. Therefore, when the treadle is initially depressed, the operator feels only the resistance of the relatively weak spring 71, thus providing the mechanism with a highly desirable "soft" pedal. The spring 88 in the off and initial brake operating positions of the parts maintains the stem 79 seated against the end wall of the cap 52. When treadle operation is initiated, therefore, the stem 79 moves with the cap 52, thus maintaining the lost motion between the stem 79 and pad 82.

The pipe 92 is connected between the master cylinder and the chamber 85. This chamber, therefore, always has present therein hydraulic pressure exactly equaling pressure in the master cylinder. As brake operation is initiated, pressure in the master cylinder will increase, and when the duplicated pressure in the chamber 85, acting on the seal 84, becomes high enough to overcome the tension of the spring 88, the stem 79 will move relatively toward the right into engagement with the pad 82 as shown in Figure 2. At this point and during the remainder of brake application, a hydraulic pressure reaction will be applied against the spool 62, which pressure will be communicated to the treadle 110, and the operator will be provided with a highly accurate degree of "feel" proportional to pressures generated in the master cylinder.

The master cylinder pressure at which hydraulic reaction against the treadle will become effective depends upon the tension of the spring 88 and the area of the stem 79 acted upon by hydraulic pressure in the chamber 85. This obviously is a matter of design in accordance with the preferences of individual motor vehicle manufacturers.

As brake application increases, full differential pressures affecting the plate 26 become progressively less effective for increasing braking pressures until a predetermined point is reached at which differential pressures affecting the plate 26 are no longer effective for moving the master cylinder plunger. Further brake pressures may be generated by the application of additional foot pressure against the treadle 100 to move the stem 79 into solid engagement with the end wall of the cap 52. Thereafter, for additional braking pressures, the motor will be directly and positively assisted by foot pressure. The pressure plate 26 of course is always resisted in its movement during brake operation in accordance with pressures generated in the master cylinder. Pressures in the chamber 85, however, are relied upon to provide the treadle 110 with hydraulic reaction "feel" until the stem 79 engages the end wall of the cap 52. Thereafter, the operator feels the direct hydraulic reactions being transmitted to the pressure plate 26.

As previously stated, spool or sleeve valves controlling pressures in motors and the like are advantageous from one standpoint in that they are easily movable from one position to another. They are disadvantageous for the reason that it is impossible to prevent leakage through a valve of this type between surfaces which slide relative to each other. Poppet valves, on the other hand, are advantageous because of more accurate control without leakage. However, poppet valves are affected by pressures which usually operate to tend to maintain a poppet valve on its seat. Used with a device of the present character, this is highly disadvantageous since in unseating a poppet valve a brake operating pedal or treadle meets the resistance encountered by the tendency of a valve to remain on its seat. Appreciable pressure is necessary to unseat the valve, and the resistance immediately drops with the result that the pressure applied to the treadle suddenly and susbtantially moves the valve.

In the present instance this disadvantage is substantially overcome by providing a valve arrangement wherein pressures are substantially balanced to render valve operation free of false resistances. Moreover, I have embodied with such valve mechanism a simple and directly operative single element, namely the stem 79, which serves in response to hydraulic pressures in the chamber 85 to provide accurate hydraulic reactions and consequently "feel" in the brake pedal, and which element further serves to directly transmit forces from the valve operating spool 62 to the valve housing 45 to assist the motor at and beyond the point of power "run-out" while at the same time preserving accurate feel in the treadle.

Referring to Figure 4, the line A diagrammatically delineates the effective area of the air valve seat 56, and this line passes approximately through the center of the diaphragm 103. Forces outwardly of this line are transmitted from the diaphragm to the relatively stationary valve housing 46 and have no effect on the valve 100 and the parts to which such valve is connected. Pressures inwardly of the line A, that is upwardly thereof in Figure 4, affect the functioning of the valve unit.

Vacuum is always present in the chamber 57 and air is always present inwardly of the valve seat 56 when the parts are in the off position shown in Figure 1. Vacuum radially outwardly of the seat 56 and vacuum acting on the face of the annular valve body opposite the valve 100 radially outwardly of line A balance each other. Vacuum in the chamber 57 outwardly of the line A acting on the diaphragm is transmitted to the valve housing 45 as stated above. Inwardly of the line A, vacuum acting on the right-hand face of the diaphragm 103 in Figure 4 balances the vacuum acting oppositely on the back face of the valve support 101 behind the valve 100. All pressures in the chamber 57 affecting the valve, valve holder and diaphragm accordingly are balanced.

With the parts in the off position shown in Figure 4, it also will be apparent that air pressure acts toward the left against the valve and its holder radially inwardly of the line A, while the same atmospheric pressure acts against equal areas behind the diaphragm 103 and valve holder 101, and accordingly the portions of the valve device subject to atmospheric pressure will be equally affected by such pressure. The valve is seated in the position shown in Figure 4, therefore, with no pressures tending to move the valve 100 either to the right or to the left except the force of the very light spring 108. Because of the balancing of the pressures affecting the valve, this spring need be of light tension, merely sufficient normally to hold the valve in engagement with the air valve seat 56. Therefore it will be apparent that when the spool 62 is moved toward the left to engage seat 63 with the valve 100, pressures will not be disturbed in the lap position of the parts, and slight additional movement of the spool 62 will unseat the valve 100 without encountering any resistance other than the light resistance of the spring 108. The spool 62 accordingly is movable to and beyond the lap position to energize the motor without transmitting any false feel to the treadle 110.

It also will be noted that during this operation there is lost motion between the stem 79 and the cushion 82 (Figure 1), the stem 79 remaining seated against the end wall of the cap 52 under the influence of the spring 88. The stem 79, therefore, offers no resistance to movement of the spool 62 until after the motor is energized and hydraulic pressures are built up in the master cylinder to a sufficient extent to move the stem 79 into engagement with the cushion 82 to provide the desired hydraulic reaction against the treadle.

The functioning of the parts described is such as to render very rapid and very smooth the operation of the booster motor. The rapidity in operation desired in a motor of this character has been attained to a high degree in the past by utilizing a vacuum suspended motor, that is, a motor having a pressure responsive unit and a valve mechanism therefor so constructed that when the parts are in the off position, vacuum is present on opposite sides of the pressure responsive unit. Rapidity in motor functioning was attained by utilizing the valve mechanism to dump air into the motor at one side of the pressure responsive unit.

In a motor of the present type it is necessary that atmospheric suspension be utilized since the pressure movable wall 26 is always subject to atmospheric pressure at one side thereof. Therefore, it is necessary to secure rapid response of the motor to operation of the treadle by resorting to relatively large valves. With conventional poppet valves this was not practicable because the false resistance encountered by unseating the vacuum valve was multiplied by the use of larger valves. The present construction renders it practicable to use valves and valve seats which are relatively large since, regardless of the sizes of these elements, there is no resistance to the unseating of the valves. The utilization of the stem 79 is highly advantageous for the reasons fully set forth above.

I claim:

1. A booster brake mechanism comprising a master cylinder unit, a fluid motor having a pressure responsive member connected to the piston of said master cylinder to displace fluid therefrom, one side of said pressure responsive member being constantly subject to atmospheric pressure, said motor at the other side of said pressure responsive member having a variable pressure chamber, a valve mechanism carried by said pressure responsive member and comprising a housing having a fixed portion provided with a bore therein and a movable member slidable in said bore, said fixed portion having a first annular valve seat, said movable member having a second annular valve seat coaxial with and spaced from said first valve seat, an annular valve in said housing, engageable with said valve seats and being biased in one direction toward said seats, means engaging and biasing said movable member away from said valve to a normal position with said second valve seat spaced from said valve, in which position said valve engages said first valve seat, there being a space within said second valve seat communicating with the atmosphere and the space between said valve seats communicating with said variable pressure chamber, said housing having a vacuum chamber in which said valve is arranged, flexible means carried by said housing and supporting said valve in said vacuum chamber, said valve and said flexible means, when said second valve seat is disengaged from said valve, having surfaces of such areas subject to atmospheric pressure and to vacuum in said vacuum chamber that said valve is pressure balanced, and manual means for moving said movable member to engage said second valve seat with said valve and to unseat said valve from said first seat to connect said vacuum chamber to said variable pressure chamber.

2. Apparatus constructed in accordance with claim 1 wherein said valve housing is provided with a hydraulic fluid chamber communicating with the master cylinder, and a pressure responsive element in axial alinement with said movable member and movable into contact therewith under the influence of pressure in said hydraulic fluid chamber when such pressure builds up to a predetermined point.

3. A booster brake mechanism comprising a master cylinder unit, a fluid motor having a pressure responsive member connected to the piston of said master cylinder to displace fluid therefrom, one side of said pressure responsive member being constantly subject to atmospheric pressure, said motor at the other side of said pressure responsive member having a variable pressure chamber, and a valve mechanism carried by said pressure responsive member and comprising a valve housing having a vacuum chamber therein and provided at one end thereof with a fixed portion having a bore therein, said fixed portion having a first annular valve seat, a member axially slidable in said bore and having a second annular valve seat concentric with and annularly spaced from said first valve seat, a valve unit in said vacuum chamber comprising a valve body, an annular valve carried thereby and engageable with said valve seats, a spring engaging and urging said valve toward said seats, an annular diaphragm having its inner periphery in sealed relation with said valve body and its outer periphery in sealed relation with said housing, resilient means engaging and biasing said axially slidable member to move said second seat to a normal position away from said valve and disengaged therefrom whereby said valve normally engages said first seat, there being a space within said second seat open to the atmosphere and the space between said seats being open to said variable pressure chamber, said valve unit, when said second seat is in said normal position, having equal areas oppositely subject to atmospheric pressure and having equal areas oppositely subject to vacuum in said vacuum chamber whereby said spring provides the sole force holding said valve on said first seat, and means connected for manually moving said axially slidable member away from its normal position to engage said second seat with said valve and move said valve away from said first seat to open said vacuum chamber to said variable pressure chamber.

4. Apparatus constructed in accordance with claim 3 wherein said valve housing is provided with a hydraulic fluid chamber communicating with the master cylinder, and means connected for utilizing pressures in said hydraulic fluid chamber when such pressures are above a predetermined point for engaging and opposing movement of said axially slidable member in a direction away from its normal position.

5. Apparatus constructed in accordance with claim 3 wherein said valve housing is provided with a hydraulic fluid chamber communicating with the master cylinder and provided with an end wall remote from said axially slidable member, a plunger slidably supported by said valve housing and subject to pressures in said hydraulic fluid chamber, and a spring biasing said plunger away from said axially movable member into normal engagement with said end wall, said plunger being coaxial with and having lost motion relative to said axially slidable member and being movable into engagement with such member by pressure in said hydraulic fluid chamber when such pressures reaches a predetermined point.

6. Apparatus constructed in accordance with claim 3 wherein said valve housing is provided with a hydraulic fluid chamber communicating with the master cylinder and provided with an end wall remote from said axially slidable member, a plunger axially slidably supported in said valve housing and having an end subject to pressures in said hydraulic fluid chamber, a spring urging said plunger away from said axially slidable member to a normal position with one end engaging said end wall, said axially slidable member having an axial recess and said plunger extending axially through said valve body and into said recess and having endwise lost motion relative to the bottom of said recess when said axially slidable member is in normal position, said plunger being movable to take up said lost motion and oppose movement of said axially slidable member away from its normal position when pressures in said hydraulic fluid chamber reach a predetermined point.

7. A booster brake mechanism comprising a master cylinder unit, a fluid motor having a pressure movable member connected to the piston of said master cylinder to displace fluid therefrom, one side of said pressure movable member being open to the atmosphere, said motor further comprising a wall remote from said pressure movable member and a bellows connecting said wall to said pressure movable member and defining therewith a variable pressure chamber, and a valve mechanism comprising a valve housing carried by said pressure movable member and projecting into said variable pressure chamber, said valve housing having a vacuum chamber and being provided at one end of such chamber with a fixed portion having a bore therein, said fixed portion having a first annular valve seat, a spool axially slidable in said bore, and having a second annular valve seat adjacent and coaxial with said first valve seat and slightly spaced therefrom, there being a space within said second valve seat communicating with the atmosphere, the space between said valve seats communicating with said variable pressure chamber, and a valve unit in said vacuum chamber, comprising an annular valve body, a resilient annular valve element carried thereby and engageable with said valve seats, a spring engaging and urging said valve toward said valve seats, an annular diaphragm forming a wall of said vacuum chamber remote from said valve seats, said diaphragm being sealed at its inner periphery to said valve body and at its outer periphery to said valve housing, and resilient means engaging and biasing said spool to a normal off position with said second valve seat disengaged from said valve whereby said valve normally engages said first valve seat, and manual means for moving said spool to engage said second seat with said valve and lift said valve from said first seat to connect said vacuum chamber to said variable pressure chamber through the space between said valve seats, said valve unit, when said valve engages said first seat, having equal areas oppositely subject to atmospheric pressure within said second valve seat and equal areas oppositely subject to vacuum in said vacuum chamber whereby said spring provides the sole force urging said valve toward said seats.

8. Apparatus constructed in accordance with claim 7 provided with means connected to be subject to hydraulic pressures in said master cylinder when such pressures reach a predetermined point incident to energization of said motor for engaging and opposing movement of said spool in a direction away from its normal position.

9. Apparatus constructed in accordance with claim 7 wherein said valve housing is provided with a hydraulic fluid chamber communicating with the master cylinder and having an end wall, a plunger slidably supported by said valve housing in axial alinement with said spool and having a surface subject to pressures in said hydraulic pressure chamber, and a spring engaging and biasing said plunger to a normal position with one end engaging said end wall, the opposite end of said plunger having a lost motion relative to said spool, which lost motion is taken up when pressures in said hydraulic fluid chamber reach a predetermined point whereby said plunger opposes movement of said spool in a direction away from its normal position.

10. A booster brake mechanism comprising a master cylinder unit, a fluid motor comprising a stationary wall and a movable pressure wall mounted for turning movement with respect to said stationary wall on a given pivot axis, and a bellows connecting said walls, said movable wall having an outer face open to atmospheric pressure and said bellows and said movable and stationary walls defining a variable pressure chamber, said movable wall being connected to the piston of said master cylinder unit to displace fluid therefrom, a valve mechanism for controlling said motor comprising a housing in said variable pressure chamber and fixed to said movable wall, said housing having a vacuum chamber and being provided with a fixed portion having at one end of such chamber a first annular valve seat, said fixed portion having a bore, a spool slidable in said bore and being provided with a second valve seat adjacent and coaxial with said first valve seat and annularly spaced therefrom, a valve unit in said vacuum chamber comprising an annular rigid valve body, an annular resilient valve carried thereby and engageable with said seats, and a diaphragm having its inner periphery sealed to said valve body and its outer periphery sealed to said housing and forming a wall of said vacuum chamber, a spring engaging and biasing said valve toward said seats, and resilient means biasing said spool away from said valve to a normal position disengaging said second seat from said valve whereby said valve normally engages said first seat, there being a space within said second valve seat communicating with the atmosphere and the space between said seats communicating with said variable pressure chamber, a flexible pipe connecting said vacuum chamber to a source of vacuum, said valve unit, when said valve engages said first seat and said spool is in said normal position, having equal oppositely facing areas subject to atmospheric pressure and having equal oppositely facing areas subjected to vacuum in said vacuum chamber whereby said valve unit is pressure balanced and said spring forms the sole means for urging said valve toward said seats, and manually operable means projecting through said movable wall into engagement with said spool for effecting movement of said spool away from its normal position to engage said second seat with said valve and to move said valve from said first seat.

11. Apparatus constructed in accordance with claim 10 provided with pressure reacting means connected to be subject to pressures in said master cylinder and engageable with said spool to oppose movement thereof away from its normal position in accordance with pressures generated in the master cylinder.

12. Apparatus constructed in accordance with claim 10 wherein said housing is provided with a hydraulic fluid chamber communicating with the master cylinder, and a plunger slidable in said housing and having a pressure area subject to pressures in said hydraulic fluid chamber and having a portion engageable with said spool to oppose movement of the latter in a direction away from its normal position in accordance with pressures in said hydraulic fluid chamber.

13. Apparatus constructed in accordance with claim 10 wherein said housing is provided with a hydraulic fluid chamber communicating with the master cylinder, and a plunger slidable in said housing and having a pressure area subject to pressures in said hydraulic fluid chamber and having a portion engageable with said spool to oppose movement of the latter in a direction away from its normal position in accordance with pressures in said hydraulic fluid chamber, said plunger being biased away from said spool and having an end portion seating against an end wall of said hydraulic fluid chamber with the other end of said plunger slightly spaced from said spool when the latter is in normal position.

14. Apparatus constructed in accordance with claim 10 provided with a treadle pivoted for rocking movement on said pivot axis and normally spaced from and arranged generally parallel to said movable wall for transmitting movement to said manually operable means.

References Cited in the file of this patent

UNITED STATES PATENTS

| | | |
|---|---|---|
| 1,831,737 | Broussouse et al. | Nov. 10, 1931 |
| 2,260,491 | Stelzer | Oct. 28, 1941 |
| 2,475,105 | Mitton | July 5, 1949 |
| 2,532,960 | Stelzer | Dec. 5, 1950 |

FOREIGN PATENTS

| | | |
|---|---|---|
| 747,273 | France | Mar. 28, 1933 |